Feb. 2, 1943.     O. A. WIBERG     2,309,878
ELASTIC FLUID TURBINE
Filed July 8, 1940     3 Sheets-Sheet 1
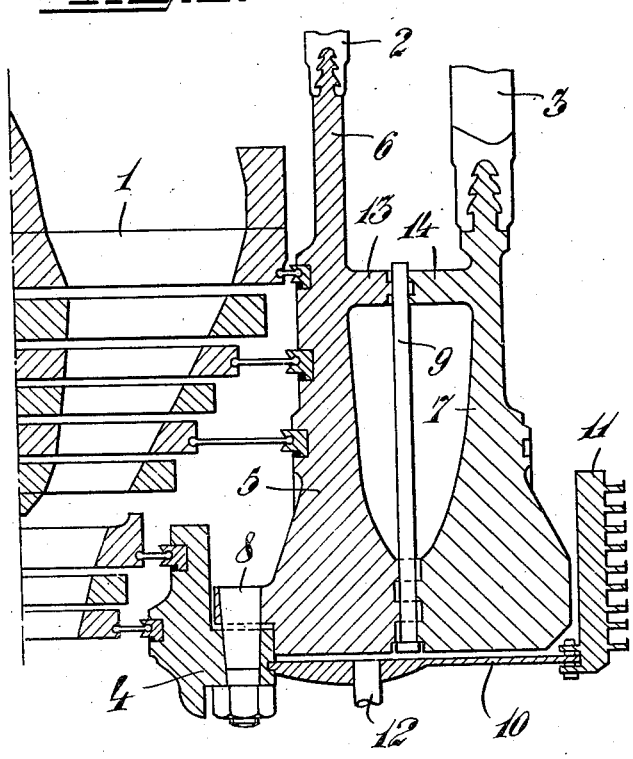
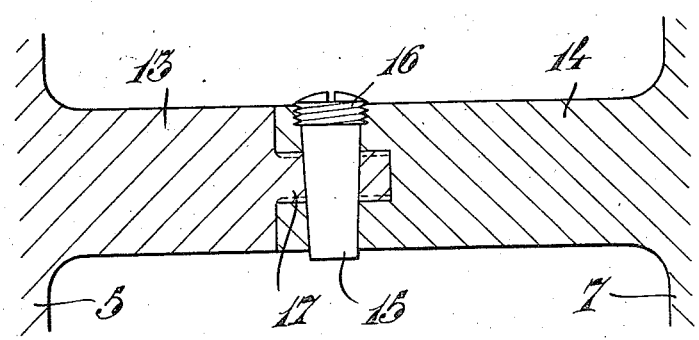
Inventor
Oscar A. Wiberg
by Sommers & Young
Attorneys

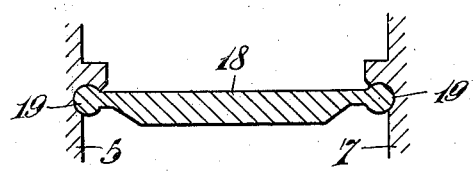
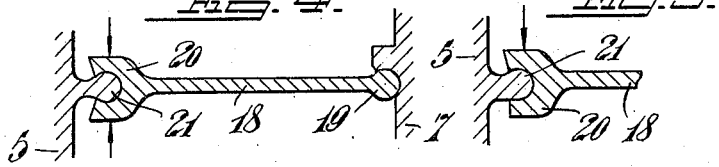
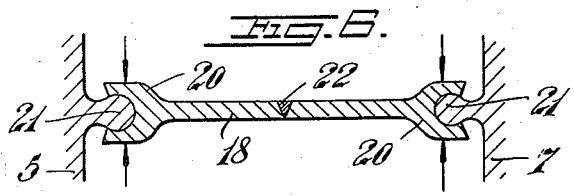
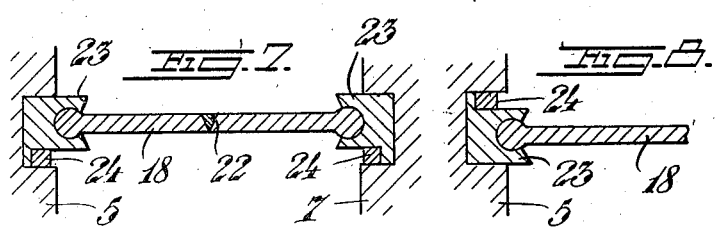
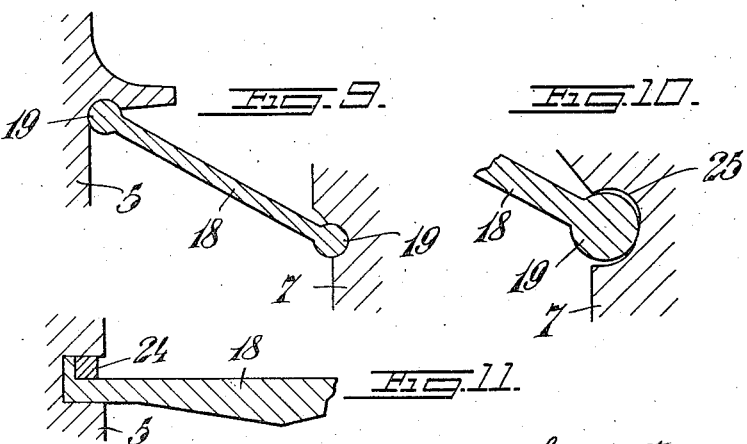

Feb. 2, 1943.   O. A. WIBERG   2,309,878
ELASTIC FLUID TURBINE
Filed July 8, 1940   3 Sheets-Sheet 3

Inventor
Oscar A. Wiberg
by Sommers & Young
Attorneys

Patented Feb. 2, 1943

2,309,878

UNITED STATES PATENT OFFICE 2,309,878

ELASTIC FLUID TURBINE

Oscar Anton Wiberg, Finspong, Sweden

Application July 8, 1940, Serial No. 344,451
In Sweden August 31, 1939

10 Claims. (Cl. 253—16.5)

This invention relates to elastic fluid turbines and more particularly to steam or gas turbines of the radial flow type in which two or more additional sets of axial flow blades are provided so as to be acted on by the driving fluid that has passed through the radial flow system, and in which said additional sets of axial flow blades are carried by axially spaced turbine discs or disc sections, to the free outer ends of which the blades are attached. The object of the invention is to provide means for suppressing vibrations in said discs, especially in the outer portions thereof. According to the invention this object is obtained by the provision of stays between the discs, preferably near the inner and outer ends thereof.

Figure 12:
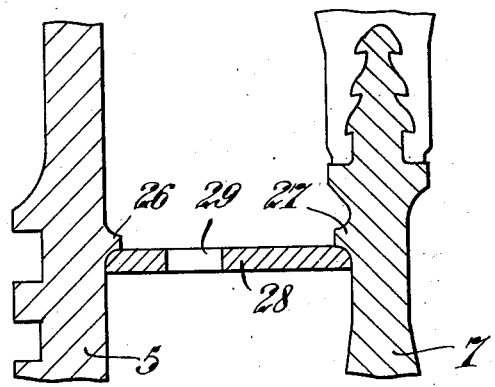

In the accompanying drawings several embodiments of the invention are illustrated. Fig. 1 is an axial section of part of a radial flow turbine having two axially spaced discs for supporting axial flow blades which are connected together by stays according to this invention. Fig. 2 is an axial section of a modified staying connection. Figs. 3-11 show further modifications of the staying connection. Fig. 12 is an axial section of the outer portions of two axially spaced turbine discs staying each other by means of a loosely inserted stay element.

With reference to Fig. 1 the numeral 1 indicates part of a radial flow blade system of a steam or gas turbine having in addition to said radial flow blade system two annular sets of axial flow blades 2 and 3, respectively. The radial flow blades 1 are carried, in part, by an inner turbine disc section 4 and, in part, by an outer turbine disc section 5. The axial flow blades 2 are carried by the said disc section 5, and the axial flow blades 3 are carried by a separate turbine disc 7 situated axially beside the turbine disc 5. The turbine disc section 5 is connected at its inner periphery to the disc section 4 by a set of radial bolts 8 and to the disc 7 by another set of radial bolts 9 engaging holes in overlapping parts or flanges of the discs 5 and 7. Inside the discs 5 and 7 is shown a cylindrical member 10 connecting a labyrinth plate 11 outside the turbine disc 7 to the turbine disc section 4, said member 10 being further connected by means of pins 12 to another labyrinth plate, not shown. It is considered that the parts of the turbine thus far shown are sufficient for illustrating this invention.

The outer portions of the two turbine discs 5 and 7 are provided with annular projections 13, 14 on their sides facing each other. Said lateral projections are formed with overlapping parts or flanges having borings to receive the outer ends of the extended bolts 9 connecting the discs 5 and 7 at their inner periphery. By these bolts the lateral projections 13, 14 are locked to each other so as to constitute a rigid tieing by which the discs 5 and 7 are caused to stiffen each other at their outer portions, thereby suppressing or considerably counteracting vibrations of the discs.

Instead of using the same bolts 9 for the outer tieing as for the inner tieing it is evident that separate bolts may be used for each tieing. In Fig. 2 separate bolts 15 are shown which connect the lateral projections 13 and 14 to each other. Said bolts 15 may either be cylindrical or conical, as shown, so that they taper inwardly in order that they may be easily inserted in the respective borings from the outside of the projections 13, 14 and be locked in position by means of screw caps 16 which may in turn be sealed in position by hammering material into the nicks for the screw-driver. In the case under consideration the projection 13 is provided with a central flange 17 engaging into between two flanges of the projection 14. The engagement between the said flange 17 and the adjacent flanges can be such as to present a certain clearance, as indicated by dotted lines in the figure.

Instead of the integral projections 13 and 14 separate stays connected to the discs may be used. Several embodiments of such separate stays are illustrated in Figs. 3-11.

According to Fig. 3, a separate connecting stay is used which comprises a cylindrical ring 18 the axis of which coincides with the axis of the turbine. At each end of said ring 18 is formed with a torus-shaped enlargement 19. To receive the enlarged ends 19 of the connecting ring the turbine discs 5 and 7 are provided with grooves into which the enlargements may be forced while utilizing the flexibility of the ring.

Fig. 4 shows a stay ring 18 having a torus-shaped enlargement 19 at one end and a fork-shaped enlargement 20 at the other end. The connection between said fork-shaped end and the respective turbine disc, as 5, is effected by means of a flange 21 formed integrally with the disc 5 which engages the fork and is locked thereto by subjecting the fork to a rolling section, as indicated by arrows. Said rolling operation is effected before the enlarged end 19 is brought into engagement with the other turbine disc, as 7.

Fig. 5 illustrates a somewhat modified form of the structure shown in Fig. 4. According to Fig. 5 the forked end 20 of the stay ring 18 is subjected to a rolling action only from outside the ring, as indicated by the arrow. It is to be noted that in this case also the other end of the ring 18 may be fork-shaped, since there is ample space to effect the rolling operation after both ends of the ring have been connected to their turbine discs.

If it is desired, however, to make both ends of the stay ring fork-shaped and apply a rolling pressure to the forks both inside and outside the stay ring 18, it is necessary from the manufacture point of view to divide the ring 18 into two pieces, for instance, by cutting it through midway between its ends, as it would otherwise be impossible to effect the inner rolling operation. The securing of the two forked ends of the stay ring 18 to the projections 21 of the respective turbine discs 5 and 7 having been completed, the two parts of the stay ring are welded together, as indicated at 22 in Fig. 6.

Another method of attaching the stay ring 18 to the turbine discs is illustrated in Figs. 7, 8 and 11, where the attachment is secured by a caulking operation. According to Fig. 7, each end of the stay ring 18 is torus-shaped and engages a separate fastening ring 23 to which it is clamped by a rolling operation. The fastening rings are placed in grooves in the turbine discs and locked in position by means of sealing rings or wires 24. If as shown in Fig. 7 said sealing wires are placed at the inside of the rings 23, the stay ring 18 must be divided in the same way as already described in connection with the description of Fig. 6, the parts of the stay ring being welded together as indicated at 22, after the sealing wires 24 have been put in their places.

When the sealing wires are placed on the outside of the stay ring 18, as shown in Fig. 8, then the stay ring may be formed as a single piece.

According to Fig. 11 one end of the stay ring 18 is in direct engagement with a groove in the turbine disc as 5, and sealed in its position therein by means of a sealing wire 24 positioned on the outside of the stay ring. In other words, no separate fastening ring is used in this case.

As shown in Fig. 9, the stay ring 18 may be conical instead of cylindrical as hereinbefore described. Even in this case the axis of the ring coincides with the turbine axis. The fastening of the conical ring to the turbine discs 5 and 7 as shown in this figure is equivalent to that of Fig. 3, though any other suitable fastening methods may be used.

In Fig. 10 is shown more in detail how to effect the insertion of an enlarged end portion 19 of a stay ring 18 into a groove of a turbine disc. Said groove should be so large compared with the enlarged end 19 as to permit said end to be inserted therein without difficulty, and it is to be preferred to provide a little clearance between the enlarged end and the groove at the upper portion thereof, as shown at 25, in order to secure a better positioning of the enlarged end in the groove.

As to the connection between an enlarged end portion 19 of the stay ring 18, and a groove in the respective turbine disc it is further to be noted that it is the outer portion of the enlarged end that yieldingly presses against the outer part of the groove so as to secure an axial locking effect. Should the thrusts be too heavy, the enlarged end may slip out of engagement with the groove because of the ring yielding inwardly.

In order to still more secure the axial connection of the turbine discs by means of the stay ring, the turbine discs may be provided with additional masses of material on their surfaces facing each other, so that the outer portions of the discs may be caused to approach each other under the action of the centrifugal force. Furthermore, the axial length of the stay rings 18 may be somewhat greater than the axial distance between the turbine discs, so that the stay ring tends to correspondingly increase the distance therebetween.

It is to be noted that modifications may be made without departure from the principle of the invention.

Hereinbefore, stay elements have been described which are either formed integrally with the turbine discs or rigidly connected thereto. In Figs. 12–17 some embodiments are shown in which the stay elements are in loose engagement with one turbine disc or both.

According to Fig. 12 the stay element comprises a cylindrical ring 28 bearing at its ends against the inner surfaces of annular flanges 26, 27 of the turbine discs 5, 7 so as to be centered by said flanges. Said ring 28 prevents the discs 5 and 7 from swinging axially towards each other beyond their normal or central mutual position, thereby suppressing the tendency for said discs to vibrate, irrespective of the fact that the ring 28 does not effect any rigid connection between the turbine discs.

If desired, the centering flange 26 or 27 of one turbine disc may be dispensed with.

In order that the set of bolts, not shown, which interconnect the discs at their inner periphery, as stated in connection with the description of Fig. 1, may be accessible the stay ring 28 may be formed with appropriate ports 29.

Figure 13:
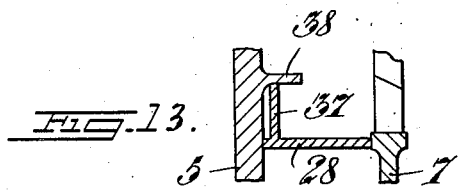

In mounting a stay ring in an already existing turbine one may proceed in the way illustrated in Fig. 13. Here, the stay ring 28 is formed with an outwardly extending radial flange 37 which is centered by bearing with its outer end against a flange 38 on one turbine disc, as 5.

What I claim is:

1. An elastic fluid turbine of the radial flow type having in combination, a radial flow blade system, sets of axial flow blades, axially spaced discs to carry said sets of axial flow blades, connections between adjacent ones of said discs at the inner periphery thereof, and means provided between said adjacent discs at the outer portions thereof for suppressing axial vibrations of the discs.

2. An elastic fluid turbine of the radial flow type having in combination, a radial flow blade system, sets of axial flow blades, arranged in series with the radial flow blades with respect to the direction of flow of the driving fluid, axially spaced annular discs to carry said axial flow blades, connections between adjacent ones of said annular discs at the inner periphery thereof, annular lateral projections on the outer portions of the opposite surfaces of said adjacent discs, and means to interconnect said annular projections so as to form a rigid stay between the discs at the outer portions thereof.

3. An elastic fluid turbine of the radial flow type having in combination, a radial flow blade system, sets of axial flow blades, arranged in series with the radial flow blades with respect to the direction of flow of the driving fluid, axially spaced annular discs to carry said axial flow blades, connections between adjacent ones of said annular discs at the inner periphery thereof, annular lateral projections on the outer portions of the opposite surfaces of said adjacent discs, overlapping co-engaging parts at the abutting ends of said projections, and bolts extending through holes in said overlapping parts to rigidly interconnect the projections.

4. An elastic fluid turbine of the radial flow type having in combination, a radial flow blade system, sets of axial flow blades, axially spaced discs to carry said sets of axial flow blades, mutually overlapping axial projections on the opposite surfaces of each two adjacent discs at the inner periphery thereof, axial projections with mutually overlapping parts on said surfaces at the outer portions of the discs, and common bolts to extend through holes in said two sets of overlapping parts for rigidly connecting the discs at their inner and outer portions.

5. An elastic fluid turbine of the radial flow type having in combination, a radial flow blade system, sets of axial flow blades, axially spaced discs to carry said sets of axial flow blades, connections between adjacent ones of said discs at the inner periphery thereof, and a separate stay between said discs at the outer portions thereof for suppressing axial vibrations of the discs.

6. An elastic fluid turbine of the radial flow type having in combination, a radial flow blade system, sets of axial flow blades, axially spaced discs to carry said sets of axial flow blades, connections between adjacent ones of said discs at the inner periphery thereof, and a separate cylindrical stay ring inserted between said discs and rigidly connected thereto, the axis of said cylindrical stay ring coinciding with the turbine axis.

7. An elastic fluid turbine of the radial flow type having in combination, a radial flow blade system, sets of axial flow blades, axially spaced discs to carry said sets of axial flow blades, connections between adjacent ones of said discs at the inner periphery thereof, lateral flanges on the opposite surfaces of said discs at the outer portions thereof, and an axial stay ring loosely inserted between said discs so as to bear against the inside of said flanges and be centered thereby.

8. An elastic fluid turbine of the radial flow type having in combination, a radial flow blade system, sets of axial flow blades, axially spaced discs to carry said sets of axial flow blades, connections between adjacent ones of said discs at the inner periphery thereof, a lateral flange on the surface of one of said discs at the outer portion thereof, an axial stay ring loosely inserted between said discs so as to engage said flange by its one end portion in order to be centered thereby.

9. An elastic fluid turbine of the radial flow type having in combination, a radial flow blade system, sets of axial flow blades, axially spaced discs to carry said sets of axial flow blades, connections between adjacent ones of said discs at the inner periphery thereof, one of said discs having on its surface facing the other disc an annular flange concentrical with the turbine axis, and a stay ring loosely bearing against the inside of said flange by its one end portion while being in engagement with an annular groove in the other disc by an enlarged portion at its other end, said stay ring being cut by axial slits at its free end so as to form axial tongues each carrying its individual additional mass.

10. An elastic fluid turbine of the radial flow type having in combination, a radial flow blade system, sets of axial flow blades, axially spaced annular discs to carry said sets of axial flow blades, connections between adjacent ones of said discs at the inner periphery thereof, and an axial stay ring provided between the outer portions of said discs, said stay ring freely engaging at least one of said annular discs.

OSCAR ANTON WIBERG.